United States Patent
Trundle et al.

(10) Patent No.: US 10,636,283 B2
(45) Date of Patent: Apr. 28, 2020

(54) SYSTEM AND METHOD FOR ALARM SIGNALING DURING ALARM SYSTEM DESTRUCTION

(71) Applicant: Alarm.com Incorporated, Tysons, VA (US)

(72) Inventors: Stephen Scott Trundle, Falls Church, VA (US); Alison Jane Slavin, Vienna, VA (US); Jean-Paul Martin, Oakton, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 16/291,129

(22) Filed: Mar. 4, 2019

(65) Prior Publication Data

US 2019/0272736 A1    Sep. 5, 2019

Related U.S. Application Data

(63) Continuation of application No. 15/822,319, filed on Nov. 27, 2017, now Pat. No. 10,223,901, which is a continuation of application No. 15/362,277, filed on Nov. 28, 2016, now Pat. No. 9,830,805, which is a continuation of application No. 14/223,273, filed on Mar. 24, 2014, now Pat. No. 9,508,249, which is a
(Continued)

(51) Int. Cl.
| | |
|---|---|
| G08B 25/10 | (2006.01) |
| G08B 29/02 | (2006.01) |
| G08B 29/16 | (2006.01) |
| G08B 25/00 | (2006.01) |
| G08B 29/00 | (2006.01) |
| G08B 29/18 | (2006.01) |
| G08B 29/04 | (2006.01) |

(52) U.S. Cl.
CPC ........... *G08B 29/02* (2013.01); *G08B 25/002* (2013.01); *G08B 25/10* (2013.01); *G08B 29/00* (2013.01); *G08B 29/16* (2013.01); *G08B 29/185* (2013.01); *G08B 29/046* (2013.01)

(58) Field of Classification Search
CPC .... G08B 25/00; G08B 25/002; G08B 25/009; G08B 25/10; G08B 25/14; G08B 29/00; G08B 29/02; G08B 29/046; G08B 29/16; G08B 29/185; G08B 13/19684
USPC ........ 340/502, 506, 527, 528, 539.1, 539.11, 340/539.14, 539.16, 539.17, 531, 540, 340/541
See application file for complete search history.

(56) References Cited

U.S. PATENT DOCUMENTS

| | | |
|---|---|---|
| 4,446,454 A | 5/1984 | Pyle |
| 4,581,606 A | 4/1986 | Mallory |

(Continued)

OTHER PUBLICATIONS

International Search Report dated Mar. 7, 2008.
(Continued)

*Primary Examiner* — Hung T Nguyen
(74) *Attorney, Agent, or Firm* — Fish & Richardson P.C.

(57) ABSTRACT

A system and method provide for the immediate transmission of a potential alarm to a remote alarm signal escrow site and from the escrow site to a host station in the event where a control panel or an alarm signaling device is tampered with or destroyed by a disablement tactic, e.g., a "crash and smash intrusion." A system and method may also send an alarm signal during such an attack by using predictive analysis of real-time events.

20 Claims, 5 Drawing Sheets

Related U.S. Application Data continuation of application No. 13/792,967, filed on Mar. 11, 2013, now Pat. No. 8,680,982, which is a continuation of application No. 12/615,318, filed on Nov. 10, 2009, now Pat. No. 8,395,494, which is a continuation of application No. 11/537,875, filed on Oct. 2, 2006, now Pat. No. 7,619,512.

(56) References Cited

U.S. PATENT DOCUMENTS

| | | | |
|---|---|---|---|
| 4,777,474 A | 10/1988 | Clayton | |
| 5,027,383 A | 6/1991 | Sheffer | |
| 5,195,126 A | 3/1993 | Carrier et al. | |
| 5,438,607 A | 8/1995 | Prygoda, Jr. et al. | |
| 5,499,014 A | 3/1996 | Greenwalt | |
| 5,511,109 A | 4/1996 | Hartley | |
| 5,621,385 A | 4/1997 | Camey | |
| 5,638,046 A | 6/1997 | Malinowski | |
| 5,777,551 A | 7/1998 | Hess | |
| 5,861,804 A | 1/1999 | Fansa et al. | |
| 5,867,105 A | 2/1999 | Hajel | |
| 5,892,442 A | 4/1999 | Ozery | |
| 6,032,036 A | 2/2000 | Maystre et al. | |
| 6,035,016 A | 3/2000 | Moore | |
| 6,049,272 A | 4/2000 | Lee et al. | |
| 6,049,273 A | 4/2000 | Hess | |
| 6,052,052 A | 4/2000 | Delmonaco | |
| 6,133,830 A | 10/2000 | D'Angelo et al. | |
| 6,211,783 B1 | 4/2001 | Wang | |
| 6,295,346 B1 | 9/2001 | Markowitz et al. | |
| 6,369,705 B1 | 4/2002 | Kennedy | |
| 6,661,340 B1 | 12/2003 | Saylor et al. | |
| 6,965,313 B1 | 11/2005 | Saylor et al. | |
| 7,081,813 B2 | 7/2006 | Winick | |
| 7,113,090 B1 | 9/2006 | Saylor | |
| 7,248,157 B2 | 7/2007 | Bergman et al. | |
| 7,518,506 B2 | 4/2009 | Lee | |
| 7,619,512 B2 | 11/2009 | Trundle et al. | |
| 8,395,494 B2 | 3/2013 | Trundle et al. | |
| 2002/0163997 A1 | 11/2002 | Bergman et al. | |
| 2003/0078029 A1 | 4/2003 | Petite | |
| 2005/0134454 A1 | 6/2005 | Eskildsen | |
| 2006/0232399 A1 | 10/2006 | Martin | |
| 2008/0284580 A1* | 11/2008 | Babich | G08B 13/19684 340/502 |
| 2014/0082623 A1* | 3/2014 | Aswath | G05B 15/02 718/102 |
| 2014/0091923 A1 | 4/2014 | Heninwolf | |
| 2014/0266684 A1 | 9/2014 | Poder | |
| 2014/0266719 A1 | 9/2014 | Dunn | |

OTHER PUBLICATIONS

U.S. Non-Final Office Action for U.S. Appl. No. 12/615,318 dated Sep. 26, 2012, 7 pages.
U.S. Notice of Allowance for U.S. Appl. No. 12/615,318 dated Jan. 18, 2013, 7 pages.
U.S. Non-Final Office Action for U.S. Appl. No. 13/792,967 dated Jun. 28, 2013, 11 pages.
U.S. Notice of Allowance for U.S. Appl. No. 131792,967 dated Nov. 22, 2013, 9 pages.
U.S. Non-Final Office Action for U.S. Appl. No. 14/223,273 dated May 18, 2016, 21 pages.
U.S. Notice of Allowance for U.S. Appl. No. 14/223,273 dated Oct. 21, 2016, 12 pages.

* cited by examiner

SYSTEM AND METHOD FOR ALARM SIGNALING DURING ALARM SYSTEM DESTRUCTION

CROSS-REFERENCE TO RELATED APPLICATIONS

This patent application is a continuation (and claims the benefit of priority under 35 USC § 120) of U.S. patent application Ser. No. 15/822,319, filed Nov. 27, 2017, now U.S. Pat. No. 10,223,901, issued Mar. 5, 2019, which is a continuation of U.S. patent application Ser. No. 15/362,277, filed Nov. 28, 2016, now U.S. Pat. No. 9,830,805, issued Nov. 28, 2017, which is a continuation of U.S. patent application Ser. No. 14/223,273, filed Mar. 24, 2014, now U.S. Pat. No. 9,508,249, issued Nov. 29, 2016, which is a continuation of U.S. patent application Ser. No. 13/792,967, filed Mar. 11, 2013, now U.S. Pat. No. 8,680,982, which is a continuation of U.S. patent application Ser. No. 12/615,318, filed Nov. 10, 2009, now U.S. Pat. No. 8,395,494, which is a continuation of U.S. patent application Ser. No. 11/537,875, filed Oct. 2, 2006, now U.S. Pat. No. 7,619,512, the entire content of the prior applications are incorporated herein by reference. This patent application also is related to U.S. patent application Ser. No. 11/190,016, filed Jul. 27, 2005, now U.S. Pat. No. 7,113,090, which is a continuation-in-part (CIP) of U.S. patent application Ser. No. 10/683,299, filed Oct. 14, 2003, now U.S. Pat. No. 6,965,313, which is a continuation of U.S. patent application Ser. No. 09/840,302, now U.S. Pat. No. 6,661,340 B1, which are all hereby incorporated by reference herein in their entirety.

FIELD OF INVENTION

The present invention relates generally to the field of security systems, in particular to a system and method for automatically providing alarm signaling to inform an owner and other authorized entities in a manner predetermined by the user when alarm situations and/or alarm worthy situations occur while an alarm system is being intentionally destroyed.

BACKGROUND OF THE INVENTION

Security systems are typically implemented by either wired or wireless sensors in the property being protected. These sensors may consist of door contacts, window contacts, glass-break detectors, motion sensors, and other types of intrusion detection sensors, as well as other environmental sensors like smoke, fire, carbon monoxide, and flood sensors. When a sensor is tripped, the system may sound a local siren, or notify an offsite host station of the event, or both. Depending on the type of sensor tripped, the system may wait for a period before sounding the alarm or notifying the host station so that the property owner or manager will have an opportunity to disarm the system. Recently, with the goal of reducing of the overall false alarm rate that has troubled the industry, the Security Industry Association (SIA) has also advocated that most residential security systems be programmed with an automatic alarm signaling delay for all intrusion alarms so that the homeowner has more time to cancel false alarms. Many security control panels today may be shipped with an SIA suggested "dialer delay" feature enabled. Security systems, which notify a host station of an alarm, are called "monitored security systems". These systems most often notify the host station, e.g., "central station", of the alarm by using, for example, telephone lines, e.g., POTS (plain old telephone service), or other landline (broadband) connection. These systems, however, may be defeated by physically cutting or otherwise disabling the line connection to the property. If the connection to the property is cut before or immediately after an unauthorized intruder enters the property, then the system may not report the alarm to the host station.

To counter line disablement, some security systems are upgraded to send alarm signals to the host station via a wireless radio. When wireless signaling from the security system to the host station occurs, the security system cannot be disabled by merely cutting the landline connection to the home or business. Nevertheless, a wireless radio-signaling device may still be vulnerable to attack. One common tactic used by intruders is a tactic known as the "crash and smash" technique.

In implementing the "crash and smash" technique, a savvy intruder may effectively disable phone lines (or other wired connections) as well as wireless signaling devices before a traditional alarm system is able to contact a user. To implement the "crash and smash" technique, the intruder crashes through a door, for example, that is programmed to delay. The delay is typically programmed by the system designer to allow the homeowner or property manager enough time to disarm their security system before the alarm is sounded, or the host station is notified. During this delay period, the system is waiting to be disarmed. Although these delay periods typically last about one minute, in response to high false alarm rates and high fines for false alarms, these delay periods are being programmed to be longer, sometimes as long as three to five minutes, and many systems today may be programmed with a signaling delay implemented for most intrusion alarms, even if the alarm was tripped by a sensor that is not on a commonly used access to the property. This delay period provides the savvy intruder enough time to crash through the door and smash the security control panel and the wireless signaling device while the control panel is waiting to be disarmed or while the system is attempting to establish an analog (dial-up) phone connection with the host station. In this way, the security system is defeated.

This and other drawbacks may exist with current systems.

SUMMARY OF THE INVENTION

A typical alarm system uses a telephone connection to report an alarm signal. A phone line based signal has a latency that is driven by (a) the need to capture the phone connection and (b) the time required to auto-dial the designated phone number, wait for an answer, and establish a handshake with the receiver. But despite these drawbacks, the telephone connection, for a variety of reasons, remains the primary signaling channel for most security system installations.

An embodiment of the present invention may provide immediate transmission of a potential alarm to a remote alarm signal escrow site via a wired or a wireless signal or a wireless TCP/IP message. Messages delivered through a wireless radio, or an active TCP/IP channel may typically be sent much more quickly than an alarm signal that needs to be sent across the phone line. The escrow site may then wait for a confirmation update that the alarm signal has been sent through the designated channel or communication path, usually through the telephone line, to the host station, or for notification update that the alarm was cancelled, or for notification update that the primary signaling channel has been disabled. In each case, the wireless radio or TCP/IP message channel may be used to send updates on the status of the signal to the escrow site. If the escrow site does not receive an update that the alarm has been successfully transmitted or cancelled, then the escrow site may determine that the control panel and/or the signaling device was possibly damaged during the intrusion. As a result, the escrow site may forward the update to the host station to signal the alarm situation. Likewise, if the update signals that the phone line has been disabled or damaged, a notification update of the alarm situation may be forwarded from the escrow site to the host station.

According to another embodiment of the present invention, real-time event analysis may also be used to protect against "crash and smash" intrusions. In this case, monitor data from one or more sensors in a protected location may be gathered and forwarded to a remote escrow site for real-time expected event analysis where the software operating at the escrow site identifies event sequence anomalies which may indicate tampering with the security control panel by comparing the actual monitor data against data which is expected. For example, if a security system is armed to report alarms, and a door is opened, the software would expect to receive either an event indicating that the system had been disarmed, or that the alarm had been triggered because the system was not disarmed within the prescribed delay period. In this example, if the software received an event indicating that a door sensor was tripped, but did not subsequently receive an event indicating a disarming or an alarm in a prescribed period of time, then the software would surmise that the security control panel or alarm signaling device had been disabled. The remote escrow site may be any location that is independent of the security control panel, either onsite, or more typically a secure offsite location. If an event anomaly is identified, a notification message may be sent to the property owner, property manager, emergency authorities, or a host station indicating that a "crash and smash" intrusion is likely in progress.

Additional advantages of the invention will be set forth in part in the description which follows, and in part will be apparent from the description, or may be learned by practice of the invention. The advantages of the invention may be realized and attained by means of the instrumentalities and combinations particularly pointed out in the appended claims.

The accompanying drawings, which are incorporated in and constitute a part of this specification, illustrate various embodiments of the invention and, together with the description, serve to explain the principles of the invention.

DETAILED DESCRIPTION OF THE PREFERRED EMBODIMENTS

Figure 1:
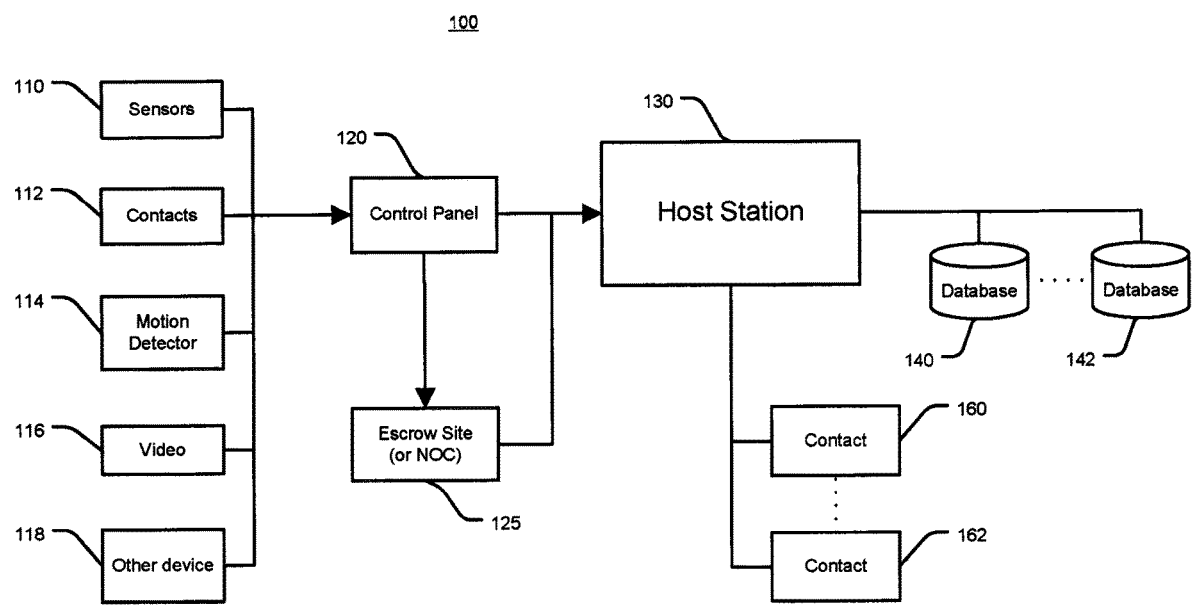
FIG. 1 is an exemplary diagram illustrating a system for alarm signaling, according to an embodiment of the present invention.

Exemplary embodiments of the invention are discussed in detail below. While specific exemplary embodiments are discussed, it should be understood that this is done for illustration purposes only. A person skilled in the relevant art will recognize that other components and configuration can be used without departing from the spirit and scope of the invention.

An embodiment of the present invention is directed to immediate transmission of a potential alarm to a remote alarm signal escrow site to provide alarm signaling in the event where a control panel or an alarm signaling device is being tampered with or destroyed by a disablement tactic, e.g., a "crash and smash intrusion." Crash and smash intrusions are becoming increasingly common. Here, an intruder may recognize that an alarm signal may be sent using a phone line or via wireless radio from the protected property. As a result, a phone line (or other wired connections) may be easily disabled prior to an intrusion. Although wireless signaling devices may be more difficult to compromise, an intruder may still disable such devices if the intruder locates the control panel and/or signaling device and physically destroys the device before an alarm signal is sent.

In order to successfully execute a "crash and smash" intrusion or other similarly destructive intrusions, an intruder, for example, may first attempt to identify the door or doors that a property owner or manager would typically use to enter the protected premise when the alarm system is armed. These doors may often be programmed to allow the property owner or manager to enter the premise and go to a control panel having, e.g., a touchpad, where they may disarm or cancel the alarm system before the alarm system triggers. Other entries ways may also be identified, e.g., garage door, back door, or other entrance. Most alarm systems may have a predetermined time period, e.g., thirty or sixty seconds or even longer, to disarm the system after entering the premises through a designated portal. In an effort to reduce the typically high false alarm rates, many systems today may be programmed with significant delay between the triggered alarm state and the alarm-signaling event so that accidental false alarms may be cancelled and unnecessary police dispatches may be avoided. If the system is not properly disarmed after this allotted time, an alarm may be triggered. If an intruder cuts the phone line prior to intrusion, an additional signaling delay may be incurred since many security control panels (e.g., the GE Simon control panel) may repeatedly attempt to send their signal via the phone line. Additional signaling delays may be incurred because these attempts to send an alarm signal via a wired connection may occur several times before a system attempts to send a signal via wireless radio. A savvy intruder may understand these processes and take advantage of these delays by crashing through the door expected to be programmed with a delay, or attacking properties installed by security companies known to install systems with high delays so that false alarms may be reduced, and then going directly to the control panel to smash or destroy it. He or she may also destroy the alarm signaling gear in the process. All this may take place even before the alarm delay period expires. As a result, the premeditated attack may provide an intruder one or more minutes of intrusion time. Other variations to the above-described intrusion may also be considered.

In accordance with an embodiment of the present invention, when an alarm situation occurs, a message may also be immediately sent via a second connection path such as a wireless radio or a TCP/IP signal channel to a remote alarm signal "escrow site" even if the panel has been programmed to primarily transmit alarms (e.g., an alarm signal) through the phone line. In one embodiment, the escrow site may be a Network Operations Center (NOC). The wireless radio or other signaling device may also send to the escrow site an update identifying the situation. For example, the update may include information about the alarm signal that the control panel is attempting to send through the telephone connection or other primary connection, an acknowledgement that the alarm signal has been successfully transmitted through its primary connection, that the phone line (or other forms of connectivity) has been disabled, or that the alarm signal has been effectively cancelled. The update may also identify other similar situations. If the escrow site does not receive an update that the alarm signal has been successfully transmitted, the escrow site may determine that the control panel and/or the signaling device may have been damaged during the intrusion. As a result, the escrow site may forward an update to inform the host station of the alarm situation, e.g., the crash and smash intrusion. Likewise, if the update indicates that the phone line has been disabled or damaged, the escrow site may forward an update to inform the host station. The remote alarm signal escrow site may choose not send an update to the host station if the alarm signal was successfully transmitted or if the property owner or manager properly disarmed or the cancelled the alarm signal.

FIG. 1 is a graphical representation of a security network system 100, according to an embodiment of the present invention. More specifically, FIG. 1 is an exemplary diagram illustrating a system for alarm signaling, according to an embodiment of the present invention. Security system 100 may include a plurality of monitor devices of varying type that transmit data to a control panel 120, which may be integrated with or separate from a control panel or other similar device. The monitor devices may include sensor 110, contact 112, motion detectors 114, video recorder 116 and/or other device 118. The monitor devices may be located at the same location, affiliated location, remote location, etc. The monitor devices may span across multiple subscribers and/or across multiple locations.

Control panel 120 may transmit alarm information to a host station 130. The host station 130 (which may also be known as a "central monitoring station") may process the alarm situation, status data and/or other relevant information. Control panel 120 may be local or remote from the sensors. The control panel 120 in this embodiment may interpret sensor data and determine if sensor data and user actions (or lack thereof) constitute an alarm condition. The control panel 120 may gather monitor data and forward the monitor data to host station 130. In addition, the control panel 120 may function as a messaging hub to buffer the monitor data and facilitate data transmission. Control panel 120 may transmit the monitor data via various modes of communication, including by way of example wireless communication, broadband, WiMax, etc. Communication may be established through various mediums. An example may include a radio modem (e.g., CreateaLink 2XT radio modem), which may transmit radio waves at a predetermined frequency (e.g., 900 MHz). Such radio waves may then be received by the host station 130 or at an intermediary system that relays the signal over a secondary communication channel (e.g., TCP/IP system) to host station 130. Other examples of modes of communication may include POTS (plain old telephone service), cable modem, DSL (digital subscriber links), wireless (two-way pager, packet switched, telephone cellular networks) and others. Other device 118 may also include a user interface box, connected over a long-range network or other network to host station 130 and/or control panel 120.

Escrow site or NOC 125 may receive an alarm signal from the control panel 120 to forward to the host station 130. The escrow site 125 in this embodiment functions as a secondary or back-up line of transmission for the control panel 120 to communicate with the host station 130. The escrow site 125 may use a software program to monitor activities tracked by the monitor devices and analyze system event sequences that would indicate a crash and smash intrusion. The host station 130 may then receive data from the control panel 120 and/or escrow site 125 and/or use an additional software program to indicate a crash and smash intrusion.

According to another embodiment, the monitor devices may transmit data directly to the host station 130, thereby bypassing the control panel 120. Monitor devices (e.g., sensors 110, contacts 112, motion detector 114, video 116 and/or other device 118, etc.) may communicate individually to the host station 130 via various modes of communication, including wireless communication, broadband (wireless and/or wired) and/or other methods including the use of a secondary control panel. They may also directly communicate with the escrow site 125. Devices (e.g., sensors, monitors, etc.) may monitor activity levels and be controlled across multiple locations through one or more interfaces. The host station 130 may receive monitor data from the various remote devices for compiling, processing and/or responding. Other actions may also be taken in response to the data.

Databases 140, 142 may store relevant information for processing the monitor data as desired by a subscriber. Exemplary database information may include user information, alarm events, reports, sensor and system event sequences, and/or other information. While shown as separate databases, it should be appreciated that the contents of these databases may be combined into fewer or greater numbers of databases and may be stored on one or more data storage systems. User information may be obtained from user database 140.

Databases 140, 142 may also store relevant information for personalized alarm services. Alarm events and other information may be stored in alarm events database 142. A user may generate reports based on historical and/or other data, which may be stored in reports database 144. Other information may be accessed and/or stored in other database 146. In addition, subscribers and/or other designated recipients, as shown by contacts 160-162, may be alerted or notified of certain events, triggers, reports and/or other desired information, via various preferred modes, including by way of example, POTS, cable modem, DSL, wireless, broadband, etc. Based on user preferences and other information, the user may be notified via various methods of communication, as specified in the user's profile and preferences information. Alert notification may be communicated via the Internet, POTS, wireless communication portals, voice portals, and/or other methods. Contact individuals and/or entities 160-162 identified by the user may also receive alert notification in an order determined by the user. The contact order and other actions may be predetermined. In addition, the user may select contact order and/or other actions through menu options at the time of alarm situation notification. An emergency entity, such as police, fire department, and/or rescue squads, may also receive alert information.

A user may register various types of security devices, including those associated with property, personal property, and/or individuals with the host station 130 of the present invention. Property may include user's home, office, vacation house or other locations. The security system may also be applied to a user's personal property, such as a car, boat or other mobile property. A security system may encompass personal security devices for individuals, such as a panic device. Other objects, locations, and property may be protected.

Various security devices may be associated with each location, item of personal property, or individual within the security network of the present invention. For property, security devices may include sensors, detectors and/or other devices for detecting alarm situations. For individuals, security devices may include a panic button or other similar device. Other security devices may be implemented with the system of the present invention.

According to an embodiment of the present invention, security devices may be predominantly wireless and communicate locally over short-range radio or other modes of communication. Each of the sensors (or group of sensors) may be equipped with a transmitter and the control panel may be equipped with a receiver. A control panel of the present invention may receive regular status information from the sensors and may be alerted when a sensor detects an alarm situation. The control panel may receive other information. Transmission of regular status information may occur at predetermined intervals, as well. For example, the sensors may send digital data packets providing status and other data at 10-second intervals, for example. Also, on or off status information may be conveyed to the escrow site 125 and/or host station 130.

Figure 2:
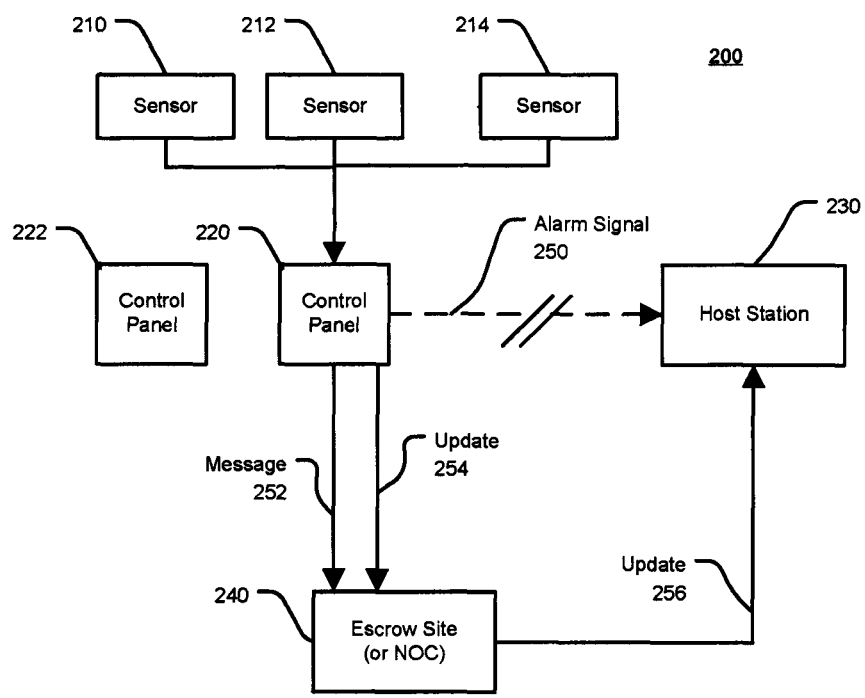
FIG. 2 is another exemplary diagram illustrating an escrow site alarm signaling system, according to an embodiment of the present invention.

FIG. 2 is an exemplary diagram illustrating a system for escrow site alarm signaling, according to an embodiment of the present invention. One or more sensors 210, 212, 214 may indicate an alarm event, e.g., a door opening, etc. Sensors 210, 212, 214 may be located within a single unit (e.g., house) or across multiple locations (e.g., chain of stores). Control panel 220 may send an alarm signal via a first communication path, e.g., a phone line (or other wired connection), in response to the alarm situation detected by one or more sensors 210, 212, and/or 214. Additional control panels represented by 222 may be implemented.

The alarm signal may be sent to a host station 230, as shown by 250. A message 252 may be sent via wireless radio. The message may be sent to a separate alarm signal escrow site 240 or NOC, as shown by 252, via a second communication path, e.g., a wireless radio. The escrow site 240 may be remote or local from the host station 230. In one embodiment, the message may be sent simultaneously with the alarm signal or shortly before or after the alarm signal. The wireless radio may also send an update 254 that provides information concerning the alarm event. For example, the update 254 may include data indicating that the alarm signal has been successfully transmitted, the control panel has detected that the phone line or other wired connection, e.g., broadband, has been disable (e.g., physically cut by an intruder), or a cancellation of the alarm signal.

If the escrow site 240 fails to receive any message or receives the message indicating that the wired connection has been disabled, the escrow site may then forward the update to the host station 230, as shown by 256, to indicate the likelihood of a crash and smash intrusion. For example, the alarm signal may not be received by the host station 230, as shown by 250. Receipt of the update at the escrow site, however, that the alarm signal was successfully transmitted or effectively cancelled may result in no further signaling by the escrow site. Host station 230 may then respond accordingly.

Figure 3:
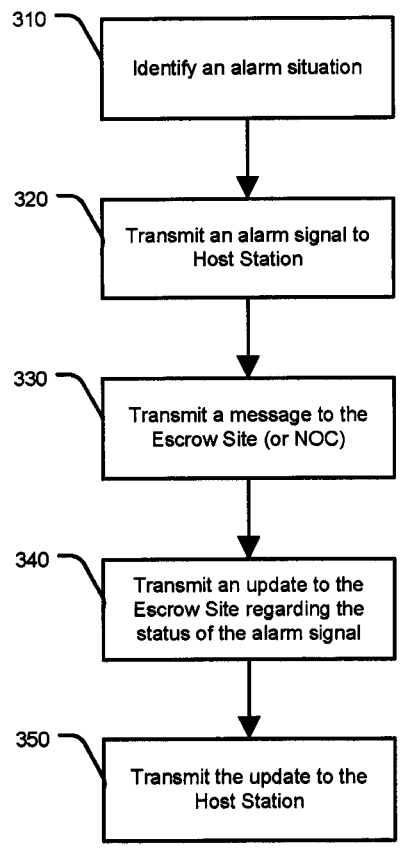
FIG. 3 is an exemplary flowchart illustrating a method for escrow site alarm signaling, according to an embodiment of the present invention.

FIG. 3 is an exemplary flowchart illustrating a method for escrow site alarm signaling, according to an embodiment of the present invention. At step 310, an alarm situation maybe identified. The alarm situation may include entry of a primary door (or other entry ways) onto a protected location. The primary door may include the door in which a property manager or owner or other delegate enters before disarming the alarm system. Other alarm situations may also include a combination of sensors and/or monitor devices in a variety of locations, and any situation where cancellation of the alarm system may be warranted. The location may include a subset within a location (e.g., one or more rooms within a home, etc) or one or more locations (e.g., stores at different areas, etc.). Cancellation of an alarm signal may include, for example, disarming an alarm system by the entry of a passcode in the touch pad of a control panel, a key, or other suitable mechanisms. Other methods of disarming may also be implemented, such as voice recognition, retina scanning, fingerprint identifications, etc. Here, a predetermined time delay may be implemented for a property owner or manager to cancel an alarm signal.

At step 320, an alarm signal may be sent from a control panel to a host station via a first communication path, e.g., a phone line (or other similar connection), in response to an identification of an alarm situation 310. The alarm signal may be sent to a host station.

At step 330, a message may be sent via a second communication path, e.g., a wireless radio (or other similar connection). The message may be sent from the control panel (or individual monitor devices) to a remote alarm signal escrow site or NOC. In one embodiment, the message may be sent simultaneously with the alarm signal or shortly before or after the alarm signal.

At step 340, the wireless radio may also send an update identifying the situation. For example, the update may indicate that the alarm signal sent via the first communication path has been successfully transmitted, the control panel has detected that the phone line or other wired connection, e.g., broadband, has been disabled (e.g., physically cut by an intruder), or a cancellation of the alarm signal. Other events or situations may also be identified by the message.

At step 350, the message may be transmitted to the host station in response to the message received at the escrow site. If the escrow site fails to receive any message or receives the message indicating that the wired connection has been disabled, the escrow site may then forward the update to the host station to indicate the likelihood of a crash and smash intrusion, as shown in step 340. Receipt of the update that the alarm signal was successfully transmitted or effectively cancelled may result in no further signaling by the escrow site.

Figure 4:
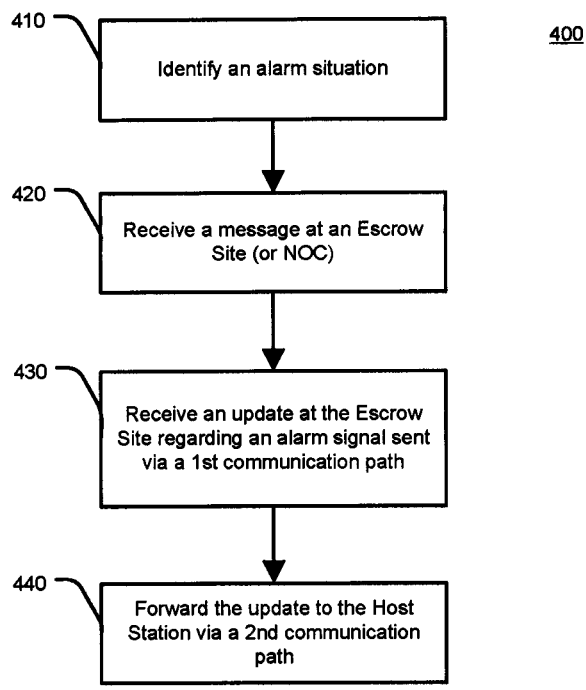
FIG. 4 is an exemplary flowchart illustrating a method for escrow site alarm signaling, according to an embodiment of the present invention.
Figure 5:
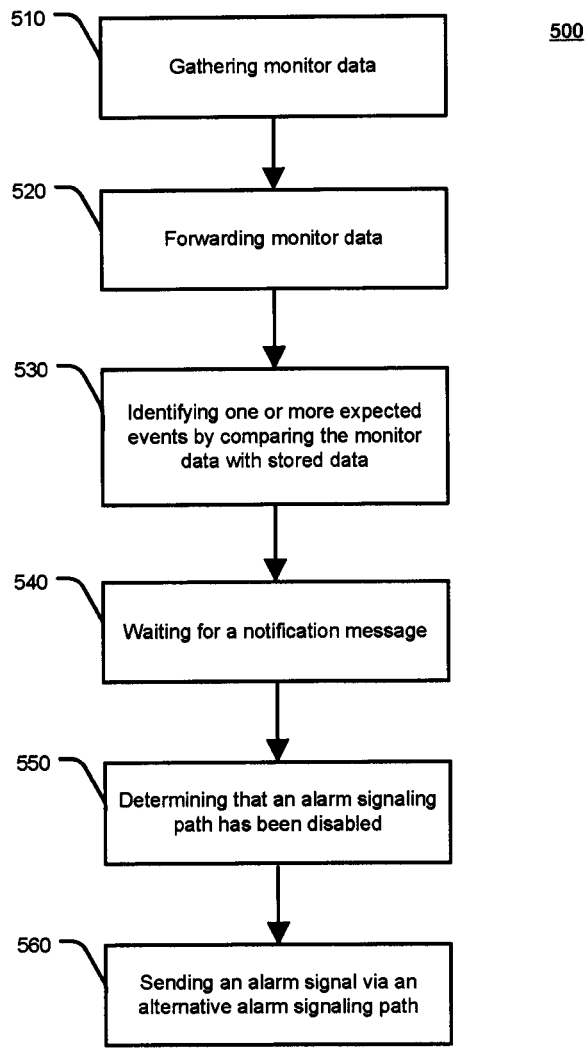
FIG. 5 is an exemplary flowchart illustrating a method for alarm signaling using real-time event analysis, according to an embodiment of the present invention.

FIG. 4 is another exemplary flowchart illustrating a method for escrow site alarm signaling, according to an embodiment of the present invention. At step 410, an alarm situation may be identified at a location. At step 420, the escrow site may receive a message from the control panel or from one or more monitor devices indicating the alarm situation.

At step 430, the escrow site may also receive a message identifying the situation. For example, the message may indicate that the alarm signal has been successfully transmitted, the control panel has detected that the phone line or other wired connection, e.g., broadband, has been disabled (e.g., physically cut by an intruder), or a cancellation of the alarm signal. Other events or situations may also be identified by the message.

At step 440, the escrow site may forward or transmit an update to the host station to indicate a crash and smash intrusion if the escrow site fails to receive any message or receives the message indicating that the wired connection has been disabled.

Real-time event analysis may also protect against crash and smash events according to another embodiment of the present invention. Here, an offsite system (e.g., in a home, office, etc.) as described above in connection with FIG. 1, may be capable of monitoring and instantly reporting each important single sensor and keypad event occurring in a particular property before and during an alarm event. Some or all sensor and system events (e.g., 110, 112, 114, 116, 118, etc.) may be immediately sent through one or more messages via broadband connection or wireless signaling to a control panel 120 or an NOC 125, both of which may be remote, where sensors may be monitored and system event sequences analyzed to indicate symptoms of a crash and smash attack.

According to one example of the present invention, if a security system is armed and a door that is programmed for a delayed alarm is opened, a message may be immediately sent to a control panel 120 or NOC 125 indicating that the door has been opened when the alarm was armed. The host station 130 may then know to expect that it should receive, within a predetermined amount of time, a message notification that the alarm system has been disarmed or that the alarm was not properly disarmed. If the host station receives no notice of either within that proscribed amount of time, then the host station may be made aware that the alarm system and/or signaling device in the property may have been damaged, disabled, or otherwise tampered with. Accordingly, an alarm event notification may then be sent to the escrow site 125 and/or to property owners or other delegates about the intrusion.

According to another embodiment, the sensors themselves may simply message their state (or other information) to a host station and the "security system" is essentially just a defined collection of sensors that send their state and unique identification (and/or other information) to the host station via a network (e.g., wireless, broadband, etc.). The same sensor may be defined to be included in several different security systems at the same time. For example, sensors 4, 5, 6 and 7 may together constitute the security system for a stock room, while sensors 4, 6, 8, 9, 10, 11, 12 and 14 may represent the security system for a building. In the case of both systems, there may be no traditional control panel involved as the sensors simply message their state and unique identity directly, or via a data hub, to the escrow site and/or host station or to software operating at a central NOC that may be capable of servicing multiple systems simultaneously.

The term "wireless" may include long-range wireless radio, local area wireless network such as 802.11 based protocols, wireless wide area network such as WiMax and/or other similar applications.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

What is claimed is:

1. A monitoring system that is configured to monitor a property, the monitoring system comprising:
   a sensor that is located at the property and that is configured to generate sensor data that reflects an attribute of the property;
   a control panel that is located at the property and that is configured to:
      receive the sensor data;
      analyze the sensor data; and
      based on analyzing the sensor data, determine that an alarm condition likely exists at the property; and
   an escrow site that is located remote from the property and that is configured to:
      receive, from the control panel, data indicating that the alarm condition likely exists at the property;
      before receiving additional data from the control panel, determine that a predetermined period of time has elapsed since receiving the data indicating that the alarm condition likely exists at the property; and
      based on determining that the predetermined period of time has elapsed since receiving the data indicating that the alarm condition likely exists at the property and before receiving the additional data from the control panel, determine that the alarm condition exists at the property.

2. The monitoring system of claim 1, comprising:
   a host station that is located remote from the property,
   wherein the escrow site is configured to:
      based on determining that the alarm condition exists at the property, transmit, to the host station, data indicating that the alarm condition exists at the property.

3. The monitoring system of claim 1, wherein the escrow site is configured to:
   based on determining that the predetermined period of time has elapsed since receiving the data indicating that the alarm condition likely exists at the property and before receiving the additional data from the control panel, determine that a component of the control panel has been damaged.

4. The monitoring system of claim 3, comprising:
   a host station that is located remote from the property,
   wherein the escrow site is configured to:
      based on determining that the component of the control panel has been damaged, transmit, to the host station, data indicating that the component of the control panel has been damaged.

5. The monitoring system of claim 3, wherein the component of the control panel is transmission equipment or alarm condition generation equipment.

6. The monitoring system of claim 1, wherein the sensor is a motion detector, contact sensor, or camera.

7. The monitoring system of claim 1, wherein the escrow site is configured to:
   based on determining that the predetermined period of time has elapsed since receiving the data indicating that the alarm condition likely exists at the property and before receiving the additional data from the control panel, determine that the sensor has been damaged.

8. The monitoring system of claim 3, comprising:
   a host station that is located remote from the property,
   wherein the escrow site is configured to:

based on determining that the component of the control panel has been damaged, transmit, to the host station, data indicating that the sensor has been damaged.

9. The monitoring system of claim 1, comprising:
a host station that is located remote from the property and that is configured to:
receive, from the control panel, the data indicating that the alarm condition likely exists at the property.

10. The monitoring system of claim 1, wherein:
the control panel is configured to:
  receive additional sensor data;
  analyze the additional sensor data; and
  based on analyzing the additional sensor data, determine that an additional alarm condition likely exists at the property; and
the escrow site is configured to:
  receive, from the control panel, data indicating that the additional alarm condition likely exists at the property;
  before the predetermined period of time has elapsed since receiving the data indicating that the additional alarm condition likely exists at the property, receive, from the control panel, data indicating that the additional alarm condition does not exist at the property; and
  based on receiving the data indicating that the additional alarm condition does not exist at the property, bypass determining that the additional alarm condition exists at the property.

11. A computer-implemented method, comprising:
receiving, by a control panel of a monitoring system that is configured to monitor a property and from a sensor that is located at the property, sensor data that reflects an attribute of the property;
analyzing, by the control panel of the monitoring system, the sensor data;
based on analyzing the sensor data, determining, by the control panel of the monitoring system that an alarm condition likely exists at the property;
receiving, by an escrow site of the monitoring system, data indicating that the alarm condition likely exists at the property;
before receiving additional data from the control panel, determining, by the escrow site of the monitoring system, that a predetermined period of time has elapsed since receiving the data indicating that the alarm condition likely exists at the property; and
based on determining that the predetermined period of time has elapsed since receiving the data indicating that the alarm condition likely exists at the property and before receiving the additional data from the control panel, determining, by the escrow site of the monitoring system, that the alarm condition exists at the property.

12. The method of claim 11, comprising:
based on determining that the alarm condition exists at the property, transmitting, to a host station of the monitoring system, data indicating that the alarm condition exists at the property.

13. The method of claim 11, comprising:
based on determining that the predetermined period of time has elapsed since receiving the data indicating that the alarm condition likely exists at the property and before receiving the additional data from the control panel, determining, by the escrow site of the monitoring system, that a component of the control panel has been damaged.

14. The method of claim 13, comprising:
based on determining that the component of the control panel has been damaged, transmitting, to a host station of the monitoring system, data indicating that the component of the control panel has been damaged.

15. The method of claim 13, wherein the component of the control panel is transmission equipment or alarm condition generation equipment.

16. The method of claim 11, wherein the sensor is a motion detector, contact sensor, or camera.

17. The method of claim 11, comprising:
based on determining that the predetermined period of time has elapsed since receiving the data indicating that the alarm condition likely exists at the property and before receiving the additional data from the control panel, determining, by the escrow site of the monitoring system, that the sensor has been damaged.

18. The method of claim 13, comprising:
based on determining that the component of the control panel has been damaged, transmitting, to a host station of the monitoring system, data indicating that the sensor has been damaged.

19. The method of claim 11, comprising:
receiving, by a host station of the monitoring system, the data indicating that the alarm condition likely exists at the property.

20. The method of claim 11, comprising:
receiving, by the control panel of the monitoring system, additional sensor data;
analyzing, by the control panel of the monitoring system, the additional sensor data;
based on analyzing the additional sensor data, determining, by the control panel of the monitoring system, that an additional alarm condition likely exists at the property;
receiving, by an escrow site of the monitoring system, from the control panel, data indicating that the additional alarm condition likely exists at the property;
before the predetermined period of time has elapsed since receiving the data indicating that the additional alarm condition likely exists at the property, receiving, by an escrow site of the monitoring system, data indicating that the additional alarm condition does not exist at the property; and
based on receiving the data indicating that the additional alarm condition does not exist at the property, bypassing, by the escrow site of the monitoring system, determining that the additional alarm condition exists at the property.

* * * * *